(12) United States Patent
Inoue et al.

(10) Patent No.: US 6,850,309 B2
(45) Date of Patent: Feb. 1, 2005

(54) LIQUID CRYSTAL DISPLAY DEVICE WITH A PLURALITY OF PROJECTIONS HAVING DIFFERENT HEIGHTS AND PROCESS FOR MANUFACTURING THE SAME

(75) Inventors: Kazuo Inoue, Hirakata (JP); Katsuhiko Kumagawa, Neyagawa (JP); Akio Takimoto, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/221,110

(22) PCT Filed: Jan. 9, 2002

(86) PCT No.: PCT/JP02/00023

§ 371 (c)(1), (2), (4) Date: Oct. 11, 2002

(87) PCT Pub. No.: WO02/056103

PCT Pub. Date: Jul. 18, 2002

(65) Prior Publication Data

US 2003/0090609 A1 May 15, 2003

(51) Int. Cl.[7] .............................................. G02F 1/1339
(52) U.S. Cl. ..................... 349/157; 349/155; 349/156
(58) Field of Search .................................. 349/155–157

(56) References Cited

U.S. PATENT DOCUMENTS

| | | | | |
|---|---|---|---|---|
| 5,459,598 A | * | 10/1995 | Carrington | 349/156 |
| 6,067,144 A | | 5/2000 | Murouchi | |
| 6,163,357 A | * | 12/2000 | Nakamura | 349/155 |
| 6,317,187 B1 | * | 11/2001 | Nakajima et al. | 349/155 |
| 6,335,781 B2 | * | 1/2002 | Kim et al. | 349/187 |
| 6,337,729 B1 | * | 1/2002 | Morii | 349/155 |
| 6,339,462 B1 | * | 1/2002 | Kishimoto et al. | 349/156 |
| 6,583,840 B1 | * | 6/2003 | Inoue et al. | 349/141 |
| 6,639,580 B1 | * | 10/2003 | Kishi et al. | 345/107 |
| 6,674,503 B2 | * | 1/2004 | Niiya et al. | 349/155 |

FOREIGN PATENT DOCUMENTS

| | | |
|---|---|---|
| EP | 1030211 A2 | 8/2000 |
| JP | 5-232465 | 9/1993 |
| JP | 10-20284 | 1/1998 |
| JP | 10-123534 | 5/1998 |
| JP | 11-242225 | 9/1999 |
| JP | 2000-29051 | 1/2000 |
| JP | 2000-29051 A | 1/2000 |
| JP | 2000-81623 | 3/2000 |
| JP | 2000-187210 | 7/2000 |
| JP | 2000-187210 A | 7/2000 |
| JP | 2000-206541 | 7/2000 |
| JP | 2000-305086 | 11/2000 |
| JP | 2000-338520 A | 12/2000 |
| JP | 2000-338520 | 12/2000 |

* cited by examiner

Primary Examiner—Huyen Ngo
(74) Attorney, Agent, or Firm—McDermott Will & Emery LLP

(57) ABSTRACT

A liquid crystal display device comprises a pair of substrates (1, 2) each having an electrode (13, 5), a liquid crystal layer held between the pair of substrates (1, 2) in which at least two kinds of projections (20, 21) having different projection heights are formed on one of the pair of substrates (1, 2) using the same material. According to one embodiment of the present invention, the liquid crystal display device further comprises a first projection which maintains a constant space between the pair of substrates and a second projection which forms asperities on the electrode to diffuse the reflected light. These projections (20, 21) are obtained by the process comprising the steps, i.e., a resin film formation step of forming a projection resin film on the surface of one of the pair of substrates (1, 2) using photosensitive resin, and a projection formation step of simultaneously forming at least two types of projections (20, 21) having different projection heights on the substrate (2) using a photomask having variable transmittances and conducting exposure and development in such a manner that resulting thickness of the projection resin film can be varied. Thus, liquid crystal display devices comprising several kinds of projections having different heights accurately formed on the predetermined positions can be obtained.

3 Claims, 13 Drawing Sheets a)

b)

c)

d)

LIQUID CRYSTAL DISPLAY DEVICE WITH A PLURALITY OF PROJECTIONS HAVING DIFFERENT HEIGHTS AND PROCESS FOR MANUFACTURING THE SAME

This application claims priority to Japanese Application No. JP 2001-1060 filed Jan. 9, 2001, Japanese Application No. JP 2001-64578 filed Mar. 8, 2001, and Japanese Application No. JP 2001-184481 filed Jun. 19, 2001.

TECHNICAL FIELD

The present invention relates to liquid crystal display devices and processes for manufacturing the same.

BACKGROUND ART

Liquid crystal display devices are used in various fields as displays for watches, calculators, personal computers, personal word processors and the like because they can be made thin and light and driven with a low voltage. In TN (Twisted Nematic)-mode liquid crystal display devices the most widely used, electrodes are formed on the upper and lower substrates, liquid crystal having a positive dielectric constant anisotropy is sandwiched between the two substrates with a twist of 90° and switched between on and off states by applying an electric field perpendicular to the substrates. This TN-mode liquid crystal panel has a narrow viewing angle, causing inversion of intensity levels.

Liquid crystal displays using VA (Vertical Alignment) liquid crystal have been developed, in which liquid crystal having a negative dielectric constant anisotropy crystal is sandwiched between the substrates and, when no electric field is applied by a perpendicularly oriented film, the liquid crystal molecules are vertically aligned, and, when an electric field is applied, the liquid crystal molecules are turned in a lateral direction. This VA-mode liquid crystal display device can obtain a wider viewing angle compared to the TN-mode liquid crystal display. However, even in the VA-mode liquid crystal display, when the liquid crystal molecules are inclined in one direction and the liquid crystal panel is observed from that direction, inversion of intensity levels inevitably occurs.

In order to overcome that drawback, for example, Japanese Unexamined Patent Publication No. 1999-242225 and Japanese Unexamined Patent Publication No. 2000-305086, etc., disclose a method in which regularly arranged projections are formed in a display region and the orientation of the liquid crystal is controlled by these projections.

Japanese Unexamined Patent Publication No. 2000-206541 discloses a method in which formation of projections is achieved on one of the substrates for maintaining a constant gap (cell thickness) between the upper and lower substrates holding liquid crystal in between and formation of a flattening film is performed on the same substrate. However, Japanese Unexamined Patent Publication No. 2000-206541 discloses neither use of at least two types of projections having different heights nor a method for manufacturing the same. According to the arrangement disclosed in the above publication, the projections are formed between the pixel electrode and the opposing electrode and the flattening film is formed beneath the pixel electrode.

Aiming at achieving a wider viewing angle than that of the TN-mode liquid crystal display device, the OCB (Optically self-Compensated Birefringence)-mode liquid crystal display device has been developed. In the OCB-mode liquid crystal display device, liquid crystal molecules are oriented in the same direction along the upper and lower substrates (splay condition). Then, the array of the liquid crystal molecules is bent (bend condition) around the center of the panel by applying a DC voltage. Thereafter, the liquid crystal molecules are driven. In this method, a projected portion is formed to readily invert from the splay condition to the bend condition (Japanese Unexamined Patent Publication No. 1998-20284).

In the ASM (Axially Symmetric aligned Microcell)-mode liquid crystal display device having liquid crystal molecules axisymmetrically oriented in the liquid crystal regions which are divided by a polymer wall, an arrangement is known in which pole-shaped projections are formed on a part of the polymer wall (Japanese Unexamined Patent Publication No. 2000-081623).

In a transmission type liquid crystal display device, light emitted from a backlight enters into the liquid crystal panel from the back. On the other hand, in a reflection type liquid crystal display device, image formation is achieved by reflecting external light with a reflecting film without using a backlight. In the reflection type liquid crystal display devices, an arrangement is known in which the pixel electrode serving as the reflecting film is obtained by forming a photosensitive film on the surface of the substrate, obtaining a large number of asperities on the surface of the film by photolithography, and depositing aluminum or like metals on the film. (Japanese Unexamined Patent Publication No. 1993-232465).

As described above, formation of projections on substrates has been applied to various kinds of liquid crystal display devices. Several kinds of projections having different heights can be formed for serving different purposes such as to control the orientation of the liquid crystal or maintain a constant cell thickness, etc. at several kinds of liquid crystal displays.

However, in the heretofore known methods, several kinds of projections having different heights have been formed out of different materials in separate production processes. Therefore, in these methods, the production efficiency is low and the precise adjustment of the positional relationship between the different kinds of projections is difficult. For example, in order to keep the cell thickness constant, if spherical resin spacers are dispersed on one of the substrates and then the two substrates are attached to each other, the spacers (spherical resin) maintaining the constant cell gap and the spacers (projection) controlling the orientation are produced in different processes using different materials. Japanese Unexamined Patent Publication No. 2000-305086 discloses a structure in which, by forming some projections on a light-blocking film, division of orientation and maintenance of the cell thickness can be performed based on the variation of the projection heights. However, in this arrangement, the light-blocking film is a part of the high projections. Therefore, this method does not achieve the production of several kinds of projections having different heights in a single process nor projections which are entirely made of the same material.

DISCLOSURE OF THE INVENTION

The present invention aims at solving the problems described above. An object of the invention is to provide a liquid crystal display device in which a plurality of projections having different heights are precisely arranged in the predetermined positions. Another object of the invention is to provide a method for manufacturing such liquid crystal display devices in an efficient manner.

In order to achieve the objects, the invention provides a liquid crystal display device comprises a pair of substrates each provided with an electrode and a liquid crystal layer held between the pair of substrates, characterized in that, on one of the pair of substrates, at least two types of projections having different heights are formed using the same material.

The projections can be formed between the electrodes disposed on each of the pair of substrates. It is possible to make the projections keep a cell thickness constant and control orientation of the liquid crystal.

It is preferable that the liquid crystal display device of the invention be constructed in a manner such that described in any one of items (1) to (4) below:

(1) The projections comprise a first projection and a second projection which is shorter than the first projection, wherein the first projection keeps the space between the pair of substrates constant and the second projection controls the orientation of the liquid crystal layer. In this case, it is preferable that the first projection have a distribution density of $25/mm^2$ or less and the second projection have a distribution density of 1/dot or greater.

(2) The projections comprise a first projection and a second projection which is shorter than the first projection, wherein the first projection keeps the space between the pair of substrates constant and the second projection forms asperities on the electrode to diffuse the reflected light. In this case, it is preferable that the first projection have a distribution density of $25/mm^2$ or less and the second projection have a distribution density of $400/mm^2$ or greater.

(3) The projections comprise a first projection and a second projection which is shorter than the first projection, wherein the first projection controls the orientation of the liquid crystal layer and the second projection forms asperities on the electrode to diffuse the reflected light. In this case, it is preferable that the first projection have a distribution density of 1/dot or greater and the second projection have a distribution density of $400/mm^2$ or greater.

(4) The projections comprise a first projection, a second projection which is shorter than the first projection, and a third projection which is shorter than the second projection, wherein the first projection keeps the space between the pair of substrates constant, the second projection controls the orientation of the liquid crystal layer and the third projection forms asperities on the electrode to diffuse the reflected light. In this case, it is preferable that the first projection have a distribution density of $25/mm^2$ or less, the second projection have a distribution density of 1/dot or greater and the third projection have a distribution density of $400/mm^2$ or greater.

The projections can be made of photosensitive resin or a metal material. By making at least one of the projections to have a trapezoidal profile, for example, the space between the substrates can readily be made constant and control of the orientation of the liquid crystal layer becomes easier.

It is preferable that the liquid crystal display device be in the OCB (Optically self-Compensated Birefringence) mode or VA (Vertical Alignment) mode. The VA-mode liquid crystal display includes the IVA (Multi-domain Vertical Alignment) mode and the CAP (Continuous Pinwheel Alignment) mode. Furthermore, the ASM (Axially Symmetric aligned Micro-cell) mode liquid crystal display is included in the category of VA-mode, if its initial orientation is vertically oriented.

The object of the invention is achieved by a method for manufacturing a liquid crystal display device having a liquid crystal layer held between a pair of substrates, in which the method comprises a resin film formation step of forming a projection resin film made of photosensitive resin on one of the pair of substrates, a projection formation step of simultaneously forming at least two types of projections having different heights on the selected substrate using a photomask having variable transmittances and conducting exposure and development in such a manner that the resulting thickness of the projection resin film can be varied and a liquid crystal inserting step of filling the space between the pair of substrates with liquid crystal (first manufacturing method).

The object of the invention is also achieved by a method for manufacturing a liquid crystal display device having a liquid crystal layer held between a pair of substrates, in which the method comprises a resin film formation step of forming a projection resin film made of photosensitive resin on one of the pair of substrates, a projection formation step of simultaneously forming at least two types of projections having different heights on the substrate using a photomask having variable transmittances and conducting exposure and development in such a manner that the resulting thickness of the projection resin film can be varied and a liquid crystal inserting step of applying liquid crystal to the surface of one of the pair substrates and attaching the selected substrate to the other substrate (second manufacturing method).

The object of the invention is also achieved by a method for manufacturing a liquid crystal display device having a liquid crystal layer held between a pair of substrates, in which the method comprises a projection formation step of simultaneously forming at least two types of projections having different heights on one of the pair of substrates by repeatedly depositing photosensitive resin, exposing and developing in a manner such that the projection color layers have different distribution patterns in their layer conditions and a liquid crystal inserting step of filling the space between the pair of substrates with liquid crystal, after attaching the substrates to each other with projection side of the selected substrate facing the other substrate (third manufacturing method).

The object of the invention is also achieved by a method for manufacturing a liquid crystal display device having a liquid crystal layer held between a pair of substrates. The method comprises a projection formation step of simultaneously forming at least two types of projections having different heights on one of the pair of substrates by repeatedly depositing photosensitive resin, exposing and developing in a manner such that the projection color layers have different distribution patterns in their layer conditions and a liquid crystal inserting step of applying liquid crystal to the surface of one of the pair of the substrates and attaching the selected substrate to the other substrate (fourth manufacturing method).

In the first to fourth manufacturing methods, it is preferable that a step of forming an electrode on one of the pair of substrates be carried out before a projection formation step.

In the first and second manufacturing methods, a projection resin film can be obtained on the surface of an electrode by further comprising a step of forming a display color layer by depositing photosensitive resin on one of the pair of substrates, followed by exposure and development, and a step of forming the electrode made of a transparent conductive film on the surface of the display color layer.

In the third and fourth manufacturing methods, a projection color layer can be formed on the surface of the electrode by further comprising a step of forming a display color layer by depositing photosensitive resin on one of the pair of substrates followed by exposure and development and a step of forming an electrode made of a transparent conductive film on the surface of the display color layer. In this case, it is preferable that the display color layer and the projection color layer be made of the same material for enhancing the production efficiency and reducing material costs.

In the first and second manufacturing methods, it is also possible to form the resin film by arranging the source wirings and the gate wirings on one of the pair of substrates in a manner such that they intersect at approximately right angles and, after forming switching elements nearby each intersection of the source wirings and the gate wirings, forming the projection resin film on the substrate. In this case, it is preferable that, after the projection formation step, electrodes be selectively formed on the projection side surface in a manner such that at least the highest projection protrude from the electrodes.

In the third and fourth manufacturing methods, it is also possible to form the projections by arranging the source wirings and the gate wirings on one of the pair of substrates in a manner such that they intersect at approximately right angles and, after forming switching elements nearby each intersection of the source wirings and the gate wirings, forming the projection resin film on the substrate. In this case, it is preferable that, after the projection formation step, electrodes be selectively formed on the projection side surface in a manner such that at least the highest projection protrude from the electrodes.

In the first to fourth manufacturing methods, by covering at least the shortest projection with the electrode, asperities are formed on the electrode to diffuse the reflected light.

BEST MODE FOR CARRYING OUT THE INVENTION

Embodiments of the present invention will be described below in more detail with reference to the drawings.

(First Embodiment)

Figure 1:
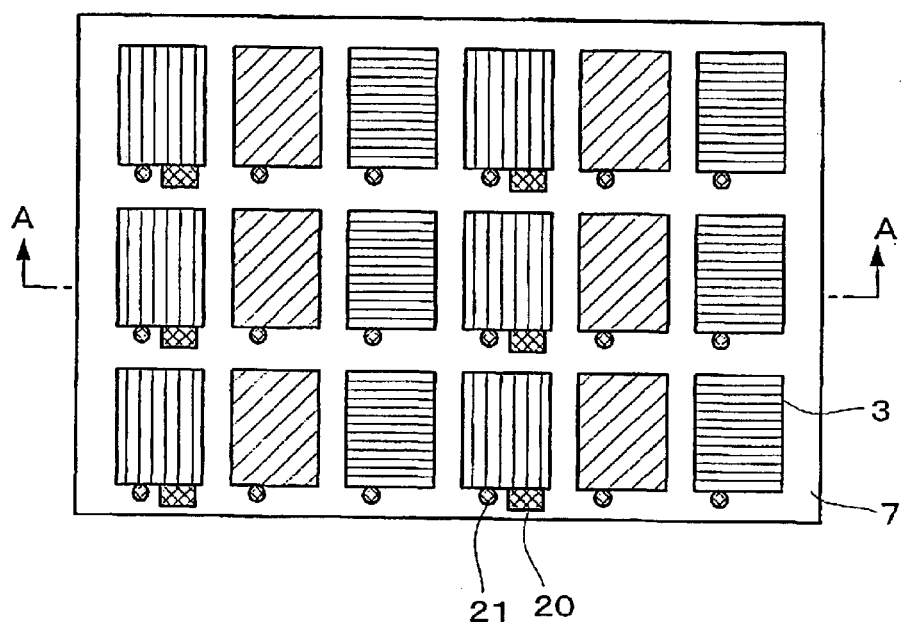
FIG. 1 is a plan view showing the opposing substrate composing the liquid crystal display device of a first embodiment of the present invention.
Figure 2:
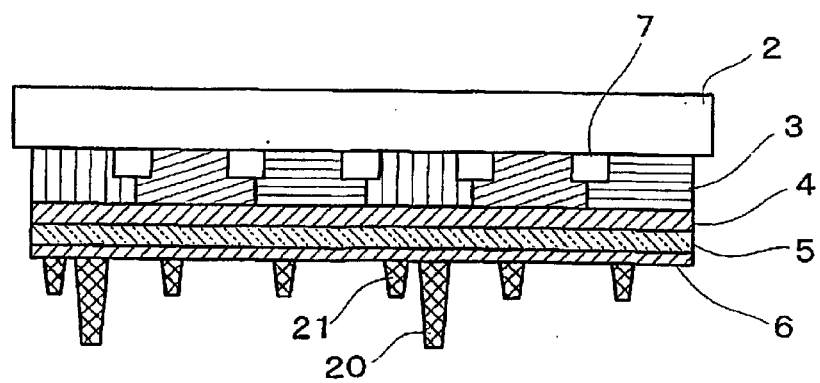
FIG. 2 is a sectional view of FIG. 1 taken along the line A—A.

FIG. 1 is a plan view showing the opposing substrate composing the liquid crystal display device of the first embodiment. FIG. 2 is a sectional view of FIG. 1 taken along the line A—A. The present embodiment is an example applying the OCB method to liquid crystal display devices. As shown in FIGS. 1 and 2, the opposing substrate 2 comprises a light-blocking film 7 for blocking light, a display color layer 3 for displaying color images, an overcoat layer 4 made of acrylic resin or the like for protecting the display color layer 3, an opposing electrode 5 for driving the liquid crystal and a horizontal orientation film 6 for horizontally orientating the liquid crystal. The opposing substrate 2 further comprises a first projection 20 and a second projection 21. The first and second projections 20, 21 have different heights. The first projection 20, which is higher than the second projection 21, functions to maintain a constant gap (cell thickness) between the opposing substrate and the array substrate described later. The second projection 21, which is shorter than the first projection 20, functions to control the orientation of the liquid crystal. This opposing substrate 2 can be manufactured by the process described below.

First, on the glass substrate forming the opposing substrate 2, film formation is achieved by sputtering chromium (Cr) or the like. Thereafter, the film is patterned into a predetermined shape to obtain the light-blocking film 7 by photolithography. The light-blocking film 7 can be formed by applying a resin material by spin coating or printing.

Next, after applying photosensitive resin having pigments dispersed therein to the substrate, exposure and development are repeated for three colors (RGB), obtaining the display color layer 3 having a dot structure.

Then, the overcoat layer 4 is formed out of acrylic resin or the like to prevent contamination of the liquid crystal layer by chromium or the like. Thereafter, an opposing electrode 5 made of ITO (Indium Tin Oxide) or like transparent conductive films is formed.

On the surface of the opposing electrode 5, the first projection 20 and the second projection 21 are formed. In the present embodiment, in order to obtain two kinds of projections having different heights in a single process, gray-tone exposure is performed. The method of obtaining a projection by gray-tone exposure is explained below with reference to FIGS. 3(a) to 3(c).

As shown in FIG. 3(a), photosensitive acrylic resin (for example, product number: "PC335" manufactured by JSR Corporation) is painted on the opposing electrode 5 by spin coating or the like to obtain a projection resin film 24, followed by prebaking for one minute at 80° C.

Thereafter, as shown in FIG. 3(b), exposure is conducted using a photomask 25. The photomask 25 has three regions a, b, c having different transmittances. Among the three regions, region a completely blocks the emitted light, region b partly transmits the emitted light and region c fully transmits the emitted light.

Development is performed using a developing solution at 25° C. for one minute, after washing the film with running water, postbaking is conducted at 220° C. for one hour. Thereby, the portion of the projection resin film 24 exposed to light is dissolved and removed. As shown in FIG. 3(c), on the area corresponding to region a, the first projection 20 having a greater height is formed, on the area corresponding to region b, the second projection 21 having a lower height is formed and on the area corresponding to region c, no projection is formed. In the present embodiment, the projection resin film 24 is made of positive photosensitive resin; however, it is also possible to obtain two types of projections having different heights using negative photosensitive resin on which the portion exposed to light remains after development. By subdividing the photomask 25 into a greater number of regions having different transmittances, it is possible to further increase the kinds of projection having different heights.

The cross sections of the first projection 20 and the second projection 21 can be circular or rectangular in accordance with the shapes of the regions a, b and c of the photomask 25. It is also possible to form them having a trapezoidal profile, as shown in FIGS. 2 and 3(c), in which the projection is tapered having its bottom at the opposing electrode 5. The method forming a slope on the first projection 20 or the second projection 21 includes, for example, on the photomask 25, the area corresponding to the slope is divided into a large number of regions having different transmittances stepwise or the transmittance of the area corresponding to the slope is continuously varied by forming a part of the surface of the photomask 25 out of a curved surface like a convex lens or a concave lens on the photomask 25. By forming the first projection 20 so as to have a trapezoidal profile, it is possible to stabilize the form of the projection and obtain an even cell thickness.

In the present embodiment, it is assumed that the projection height of the first projection 20 is 5 $\mu$m and the projection height of the second projection 21 is 2 $\mu$m. Furthermore, in the present embodiment, it is assumed that, as shown in FIG. 1, both the first projection 20 and the second projection 21 are formed on the light-blocking film 7, the interval between two adjacent first projections 20 is about 300 $\mu$m (a three dot interval) and the interval between two adjacent second projections 21 is 100 $\mu$m (a one dot interval). The first projection 20 functions to maintain a constant space between the two facing substrates (i.e., the opposing substrate and the array substrate), and therefore if the interval of the two adjacent first projections 20 is too narrow, the two substrates will be fixed firmly. Consequently, when the liquid crystal layer sealed between the substrates shrinks or expands due to temperature change, the space between the substrate cannot match this volume change and bubbles tend to be generated in the liquid crystal layer. Therefore, it is preferable that the interval between any two adjacent first projections 20 be 200 $\mu$m or greater (or the distribution density be 25/mm$^2$ or less). On the other hand, the second projection 21 functions to control the orientation of the liquid crystal and desirably should be disposed in every dot. A plurality of second projections 21 can be arranges in a dot. In other words, it is preferable that the distribution density of the second projection 21 be 1/dot or greater. The first projections 20 are also formed on the periphery portion which is sealed with the array substrate described later.

Figure 4:
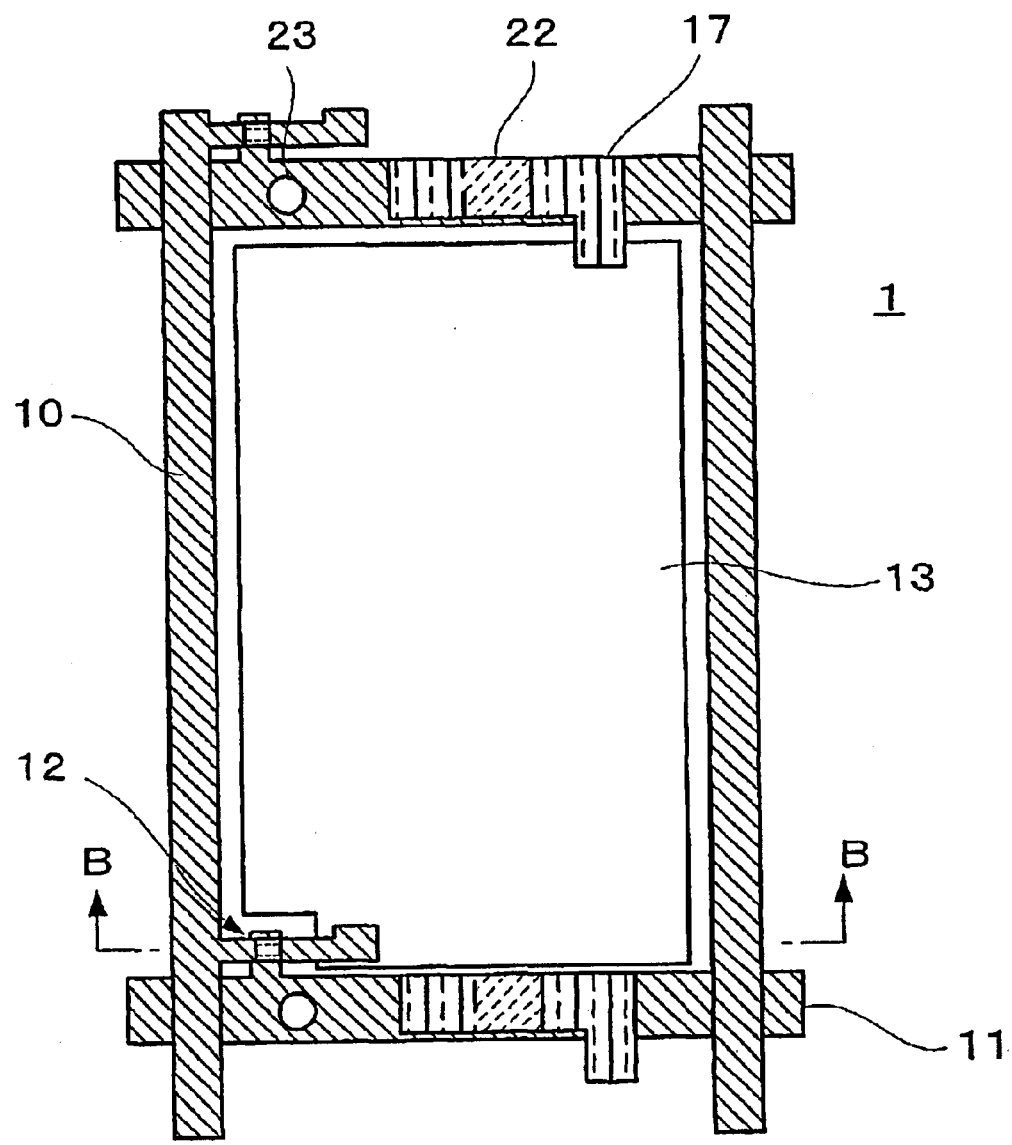
FIG. 4 is a plan view showing the main part of the array substrate composing the liquid crystal display device of the first embodiment.

An array substrate facing the opposing substrate 2 will be explained below. FIG. 4 is a plan view showing the main part of a dot of the array substrate.

As shown in FIG. 4, on the array substrate 1 formed out of a glass substrate, source wirings 10 supplying image signals and gate wirings 11 supplying scanning signals are arranged so as to intersect at approximately right angles. The regions 22 and 23 on the gate wiring 11 respectively correspond to the positions of the first projection 20 and the second projection 21, when the array substrate 1 is attached to the opposing substrate 2.

Nearby each intersection of the source wiring 10 and the gate wiring 11, a thin-film transistor (TFT) 12 having a semiconductor layer is formed as a switching element. To each dot, a pixel electrode 13 formed of a transparent conductive film made of ITO (Indium Tin Oxide) or the like is arranged and the pixel electrode 13 is connected to the source wiring 10 having the TFT 12 in between. Above the gate wiring 11, a storage capacitor region 17 is formed having an insulating layer in between and connected to the pixel electrode 13. The structure of the array substrate 1 is generally known, and therefore a detailed explanation of its production process is omitted.

Figure 5:
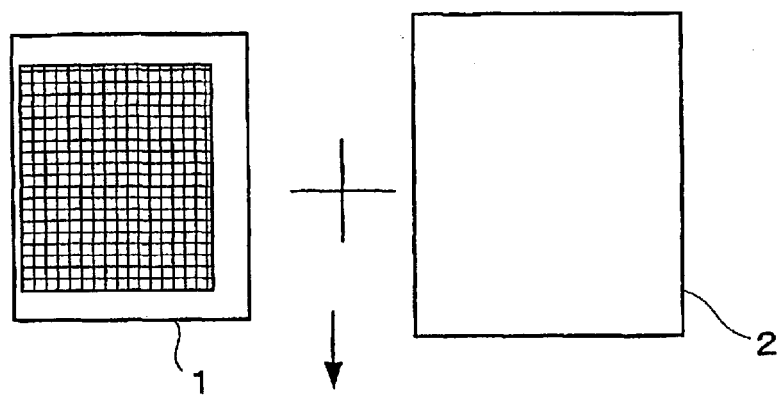
FIGS. 5(a) to 5(c) are cross-sectional views illustrating the production process of the liquid crystal display device of the first embodiment.
Figure 5:
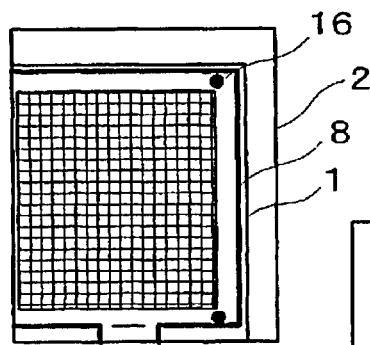
Figure 5:
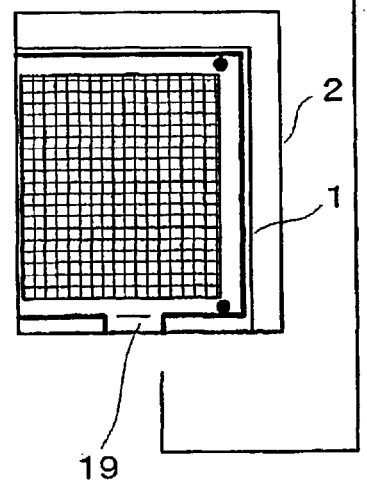
Figure 5:
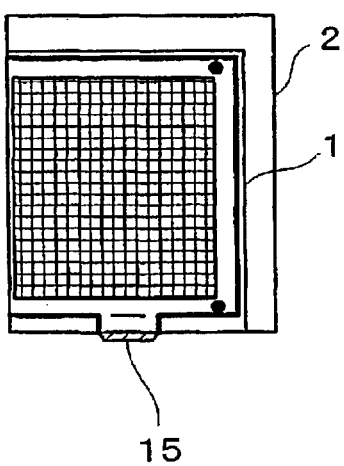

With reference to FIG. 5, the method to manufacture a liquid crystal panel composed of the array substrate 1 and the opposing substrate 2 will be explained below. After washing the array substrate 1 and the opposing substrate 2, horizontal orientation films are printed on their surfaces. The substrates are heated to 200° C. for one hour to cure them, followed by the rubbing process conducted in the same direction as each horizontal orientation film (FIG. 5(a)).

Figure 6:
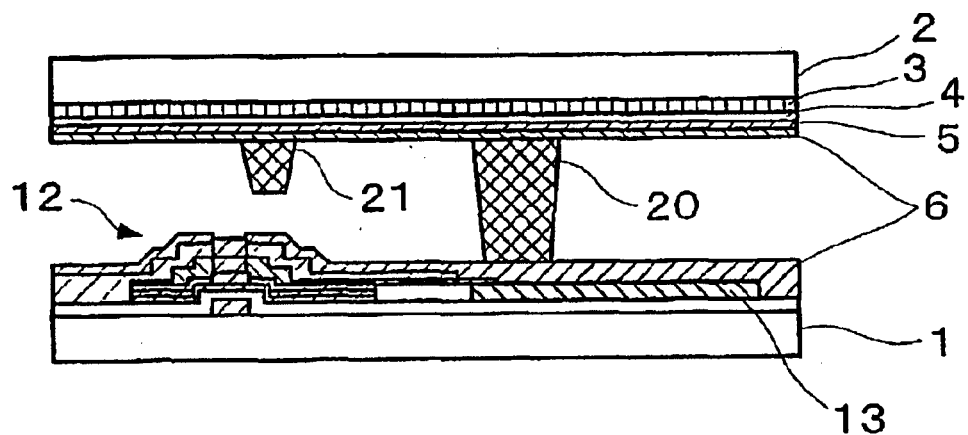
FIG. 6 is a cross-sectional view of the empty panel of FIG. 4 taken along the line B—B.

Sealing resin 8, an epoxy or like resin, is applied to either the array substrate 1 or the opposing substrate 2 along the sealing area. In order to make the array substrate 1 and the opposing substrate 2 conductive, conductive paste 16 is applied thereto. Thereafter, the array substrate 1 and the opposing substrate 2 are attached to each other and heated to 150° C. for two hours to cure the sealing resin 8, obtaining an empty panel (FIG. 5(b)). FIG. 6 is a cross-sectional view of the empty panel of FIG. 4 taken along the line B—B.

The empty panel is placed in a container having a reduced pressure, and nematic liquid crystal is injected into the gap between the array substrate 1 and the opposing substrate 2 by the vacuum injection method (i.e., after evacuating the inside of the panel, an injecting hole 19 is dipped in liquid crystal. Then, by returning the container pressure to atmospheric pressure, liquid crystal is injected into the panel) (FIG. 5(c)).

Hole-filling resin 15 made of photo-curable resin is applied to the entire surface of the injecting hole 19, and the hole-filling resin is cured by being exposed to light (FIG. 5(d)).

Then, to the outer surfaces of the array substrate 1 and the opposing substrate 2 (opposite side of the facing surfaces), a polarizing plate is attached, obtaining a liquid crystal panel composing a liquid crystal display device.

Operation of the liquid crystal molecules of the liquid crystal display device will be explained below with reference to FIGS. 7(a) to 7(c). The liquid crystal molecules sealed between the array substrate 1 and the opposing substrate 2 undergo rubbing in the same direction on each substrate. Therefore, before applying a voltage, the orientation directions of the liquid crystal molecules 9 become substantially parallel to the array substrate 1 and the opposing substrate 2, resulted in a splayed orientation having pretilt angles near the array substrate 1 and the opposing substrate 2 of 10° or smaller (FIG. 7(a)).

Figure 7:
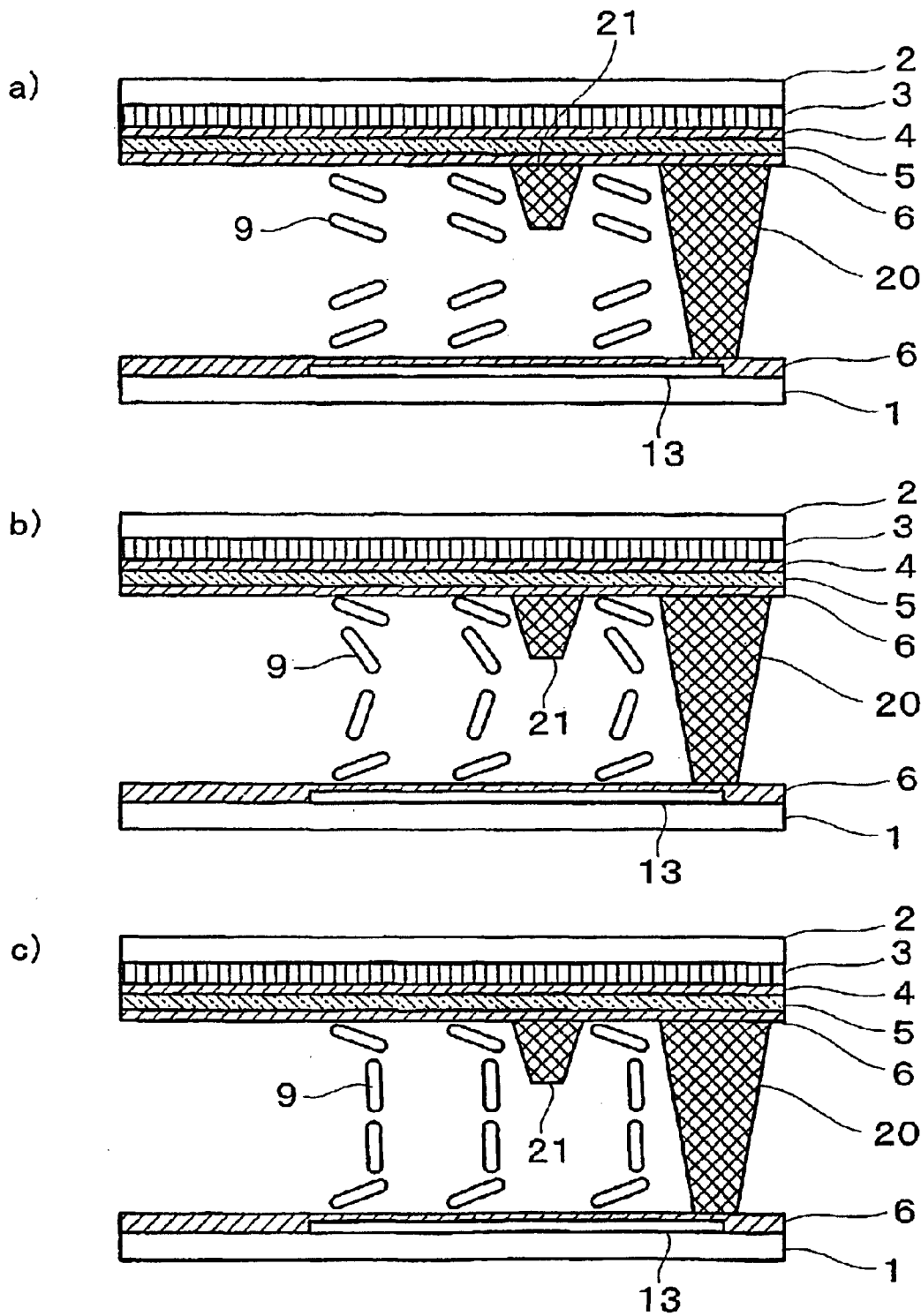
FIGS. 7(a) to 7(c) are cross-sectional views illustrating the operation of the liquid crystal molecules in the liquid crystal display device of the first embodiment.

When an electric field is generated between the array substrate 1 and the opposing substrate 2 by applying a DC voltage to the liquid crystal display device, the array of the liquid crystal molecules 9 as a whole will have a bend orientation direction (FIG. 7(b)). On the opposing substrate 2, the second projection 21 is formed. Therefore, it is readily transferable from the splay orientation to the bend orientation with a starting point around the second projection 21, obtaining an excellent orientation state. If the TFT 12 is turned on when the liquid crystal molecules 9 are in a bend-orientation condition, the liquid crystal molecules 9 become as shown in FIG. 7(c).

As described above, in the liquid crystal display device according to the present embodiment, by using the photomask 25 comprising the regions a, b and c each having prescribed transmittances, it is possible to form the first projection 20 and the second projection 21 having different projection heights on the opposing substrate 2 in a single production process. Thus, the manufacturing process can be simplified.

This arrangement requires alignment of the photomask 25 only once. Therefore, the first projection 20 and the second projection 21 can be accurately formed on the prescribed positions outside the display region, allowing the first projection 20 and the second projection 21 to be reliably formed outside the display region. Compared to the arrangement in which a spacer 120 made of glass fiber or the like is dispersed to maintain a constant cell thickness, the arrangement of the present embodiment enables enhancement of the transmittance of the display region and attainment of brighter display images.

In the present embodiment, the first projection 20 and the second projection 21 can be made of the same material, reducing the material costs. Furthermore, this obtains a uniform optical property in the display plane since the interactions observed between the liquid crystal molecules and the first projection 20 and between the liquid crystal molecules and the second projection 21 become approximately the same.

(Second Embodiment)

Figure 8:
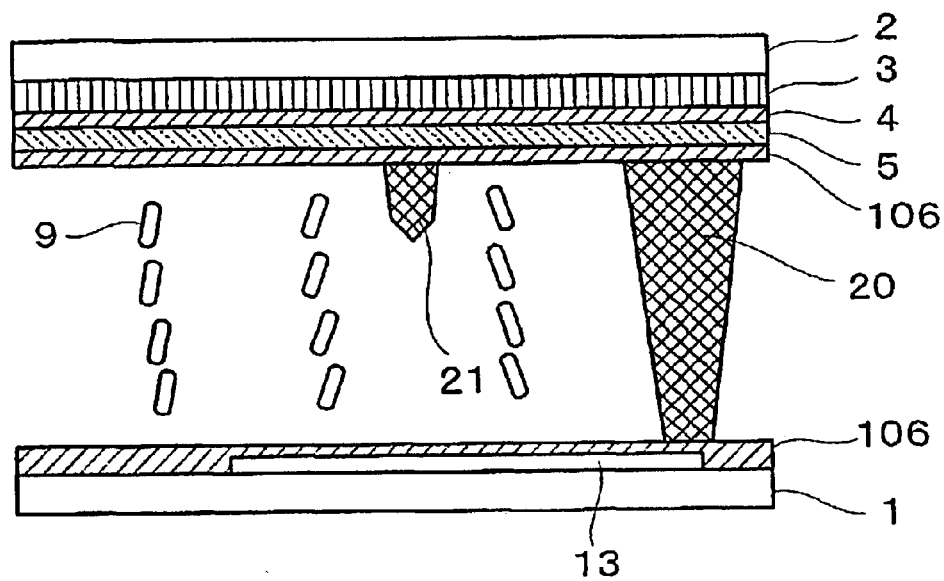
FIGS. 8(a) and 8(b) are cross-sectional views showing the main part of the liquid crystal panel mounted on the liquid crystal display device of a second embodiment.
Figure 8:
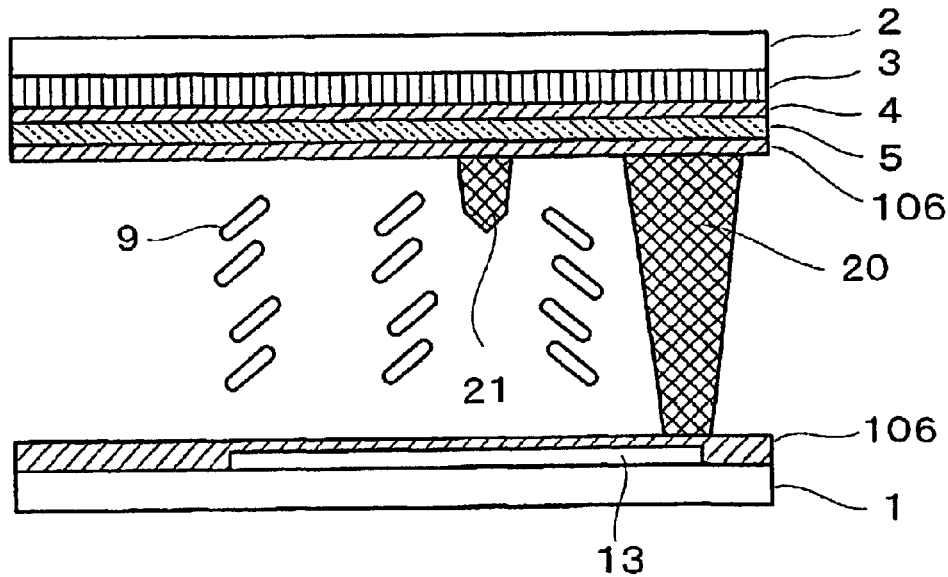

FIGS. 8(a) and 8(b) are cross-sectional views showing the main part of the liquid crystal panel mounted on the liquid crystal display device of the second embodiment. In FIGS. 8(a) and 8(b), those elements which are identical to the elements of the liquid crystal display of the first embodiment described above are identified with the same reference symbols, and repetitious explanation will be omitted.

The liquid crystal display device of the first embodiment comprises an OCB-mode liquid crystal panel; however, the liquid crystal display device of the present embodiment comprises a VA-mode liquid crystal panel. In other words, in the present embodiment, the liquid crystal panel is provided with vertical orientation films 106 instead of the horizontal orientation films 6 which are disposed on the array substrate 1 and opposing substrate 2 in the first embodiment.

The vertical orientation film 106 can be obtained, for example, by printing an isopropyl alcohol solution containing 0.3 wt. % of n-octadecyl triethoxysilane on the array substrate 1 and the opposing substrate 2, followed by heat drying at 100° C. for one hour. In this embodiment, nematic liquid crystal having a negative dielectric constant anisotropy is used.

Instead of forming the second projection 21 having a trapezoidal profile, in the present embodiment, the second projection 21 is formed so as to have a triangle-shaped end portion. In other respects, the construction thereof is the same as that of the first embodiment. The triangle-shaped end portion of the second projection 21 can be formed by the same process obtaining the slope described in the first embodiment.

When the thus obtained liquid crystal panel is in an off-status, the liquid crystal molecules 9 will become oriented almost perpendicular to the array substrate 1 and the opposing substrate 2; however, as shown in FIG. 8(a), the liquid crystal molecules 9 will slightly tilt, affected by the second projection 21. The liquid crystal molecules 9 have different pretilt directions on each side sandwiching the second projection 21, and therefore the orientation directions can be divided without rubbing the orientation film 106.

When the liquid crystal panel is turned on by applying a voltage, as shown in FIG. 8(b), the liquid crystal molecules will be inclined along the slope of the second projection 21. As a result, the liquid crystal molecules 9 are inclined in two directions, obtaining a wide viewing angle.

In the present embodiment, the first projection 20 for maintaining a constant cell gap and the second projection 21 for controlling the orientation can be made of the same material by the same production process. Therefore, effects similar to those of the first embodiment can be obtained.

Other than the structure described in the present embodiment, the VA-mode liquid crystal display includes the MVA (Multi-domain Vertical Alignment)-mode liquid crystal display and the CPA (Continuous Pinwheel Alignment)-mode liquid crystal display, which have a further increased number of orientation divisions, and liquid crystal display devices using these schemes can be manufactured by a procedure similar to that of the present embodiment.

(Third Embodiment)

Figure 9:
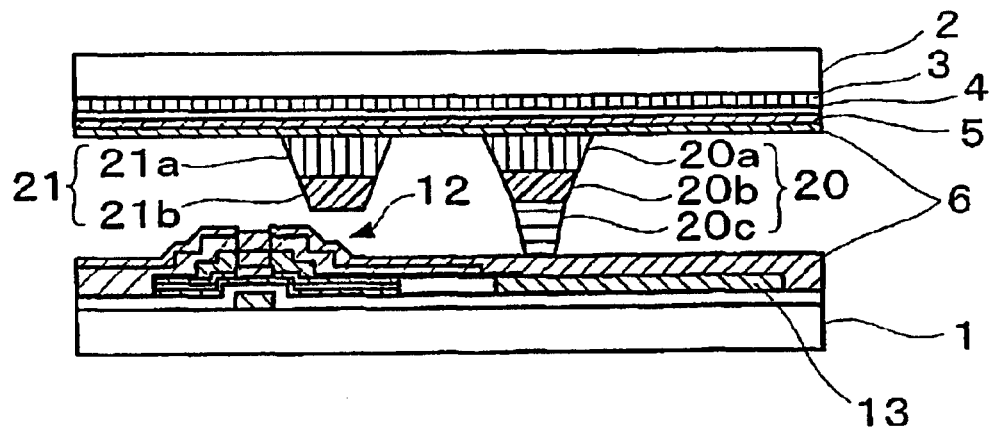
FIG. 9 is a cross-sectional view showing the main part of the liquid crystal panel mounted on the liquid crystal display device of a third embodiment.

FIG. 9 is a cross-sectional view showing the main part of the liquid crystal panel mounted on the liquid crystal display device of the third embodiment. In FIG. 9, those elements which are identical to the elements of the liquid crystal display of the first embodiment described above are identified with the same reference symbols, and repetitious explanation will be omitted.

In the liquid crystal display device of the first embodiment, the first projection 20 and the second projection 21 are formed by performing gray-tone exposure; however, in the liquid crystal display device of the present embodiment, the first projection 20 and the second projection 21 are formed by depositing the projection color layers.

In other words, after forming an opposing electrode 5 by following the same procedure as the first embodiment, the projection color layers are overlaid in a similar manner to form the display color layers 3 which display color images, i.e., repeating deposition, exposure and development for three colors (RGB). For example, on the portion where the first projection 20 is formed, the three (RGB) projection color layers 20a, 20b, 20c are placed in this order. However, on the portion where the second projection 21 is formed, only two colors (RG) of projection color layers 21a, 21b are deposited in this order. On the area other than these portions, formation of projection color layers is not achieved. Thereby, two kinds of projections made of the same material and having different heights are obtained in a single process. Thereafter, by following the same process as in the first embodiment, the liquid crystal display device can be manufactured. The first projection 20 and the second projection 21 are formed on the gate wiring 11 disposed outside of the display region.

The liquid crystal display device according to the present embodiment achieves effects similar to those obtained in the first embodiment. In addition, further reduction of material costs can be achieved since the first projection 20 and the second projection 21 can be made of the same material used in the display color layers 3 displaying color images.

(Fourth Embodiment)

Figure 10:
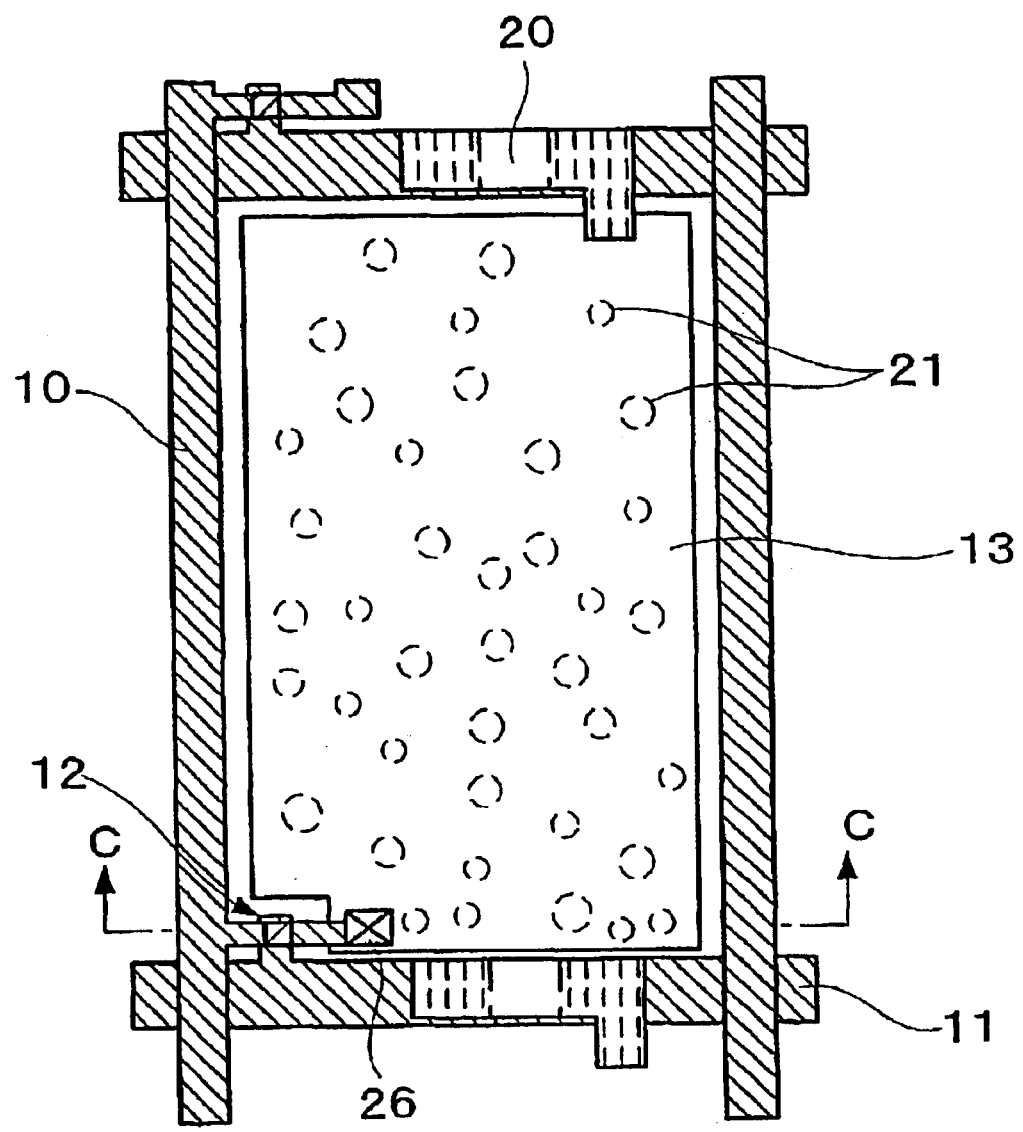
FIG. 10 is a plan view showing the main part of the liquid crystal panel mounted on the liquid crystal display device of a fourth embodiment.
Figure 11:
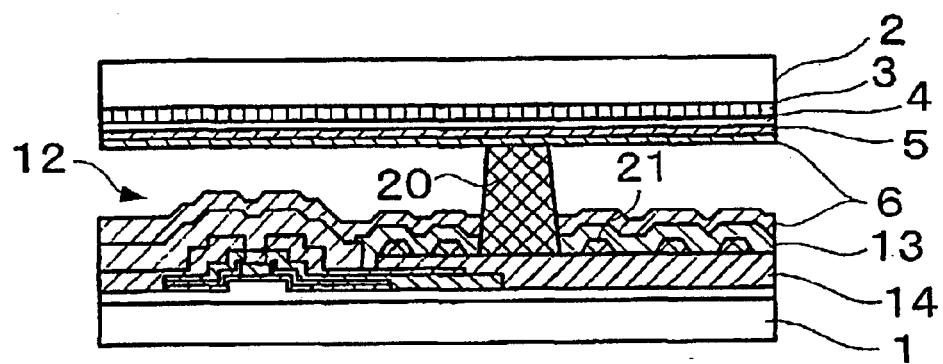
FIG. 11 is a cross-sectional view of FIG. 10 taken along the line C—C.

FIG. 10 is a plan view showing the main part of the liquid crystal panel mounted on the liquid crystal display device of the fourth embodiment. FIG. 11 is a cross-sectional view of FIG. 10 taken along the line C—C.

In FIGS. 10 and 11, those elements which are identical to the elements of the liquid crystal display of the first embodiment described above are identified with the same reference symbols, and repetitious explanation will be omitted.

The liquid crystal panel of the liquid crystal display device according to the present embodiment comprises, similar to the first embodiment, a first projection 20 having a greater projection height and a second projection 21 having a lower projection height both formed on the array substrate 1. The first projection 20 serves to maintain a constant cell thickness and the second projection 21 serves to diffuse the reflected light. In other respects, except that the pixel electrode 13 is made of aluminum or like metals to reflect the incident light, the construction thereof is the same as that of the first embodiment.

The manufacturing process of this liquid crystal panel will be explained below. An opposing substrate 2 is formed by the same process as in the first embodiment; however, the orientation film is obtained without forming the first projection 20 and the second projection 21 on the surface of the opposing electrode 5.

An array substrate 1 is formed by the same process as in the first embodiment, i.e., on the array substrate 1 formed out of a glass substrate or the like, the source wirings 10 and the gate wirings 11 are arranged to intersect at approximately right angels, and nearby each intersection between the source wiring 10 and the gate wiring 11, the TFT 12 having a semiconductor layer is formed as a switching element. Thereafter, on the surface of the insulating film 14 formed out of a $SiO_2$ film, a SiNx film or the like for protecting the TFT 12, the first projection 20 and the second projection 21 are formed.

Formation of the first projection 20 and the second projection 21 is achieved by forming a projection resin film 24 on the insulating film 14 and, as in the first embodiment, performing gray-tone exposure (see, FIGS. 3(a) to 3(c)). The height and the position of the first projection 20 are assumed to be the same as those in the first embodiment.

On the other hand, the second projections 21, which function to make the reflected light sufficiently diffusive, have a height of 0.5 μm and a great many of them are formed in the dot. Specifically, it is preferable that the second projections 21 be formed with intervals of 50 μm or less or having a distribution density of 400/mm$^2$ or greater.

In the present embodiment, the first projection 20 and the second projection 21 are obtained by forming the projection resin film 24 on the insulating film 14; however, it is also possible to obtain the first projection 20 and the second projection 21 on the upper surface of the insulating film 14 by performing the gray-tone exposure without forming the projection resin film 24.

After forming the first projection 20 and the second projection 21, on the surface thereof, a pixel electrode 13 made of aluminum is selectively formed and electrically connected to a drain electrode through a contact hole 26 formed on the insulating film 14. Thereby, the first projection 20 protrudes from the pixel electrode 13, and the second projection 21 becomes covered with the pixel electrode 13. By being formed above the second projection 21, the pixel electrode 13 obtains asperities on the surface, achieving an excellent reflecting property. The material of the pixel electrode 13 is not limited as long as it functions as a reflector. Then, the fabrication of the liquid crystal display device is completed by following the same process as in the first embodiment.

Similar to the first embodiment, in the liquid crystal display device according to the present embodiment, since the first projection 20 and the second projection 21 can be formed on the opposing substrate 2 in a single process, the manufacturing process can be simplified.

Furthermore, the first projection 20 and the second projection 21 can be formed precisely on the predetermined area. This makes it possible to dispose the first projection 20 outside the display region and a great many of the second projections 21 in each dot at a predetermined distribution. This allows a reflection type liquid crystal display device displaying high quality pictures to be obtained.

Since the first projection 20 and the second projection 21 can be made of the same material, reduction of the material costs is also achievable.

(Fifth Embodiment)

Figure 13:
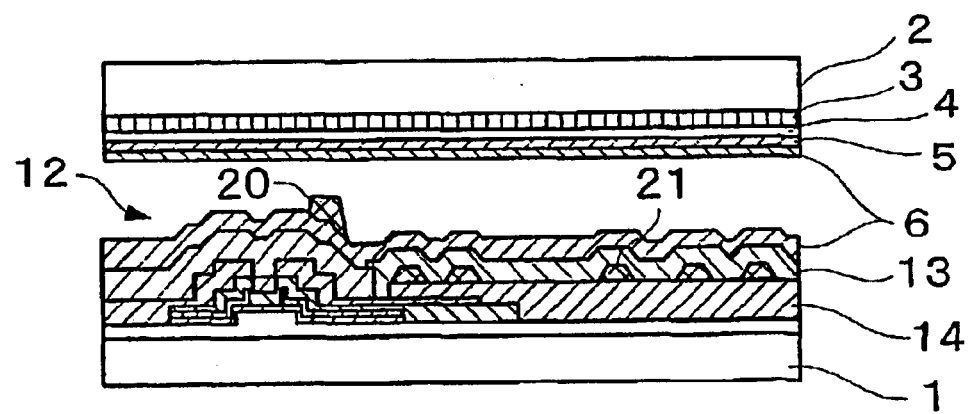
FIG. 13 is a cross-sectional view of FIG. 12 taken along the line D—D.
Figure 12:
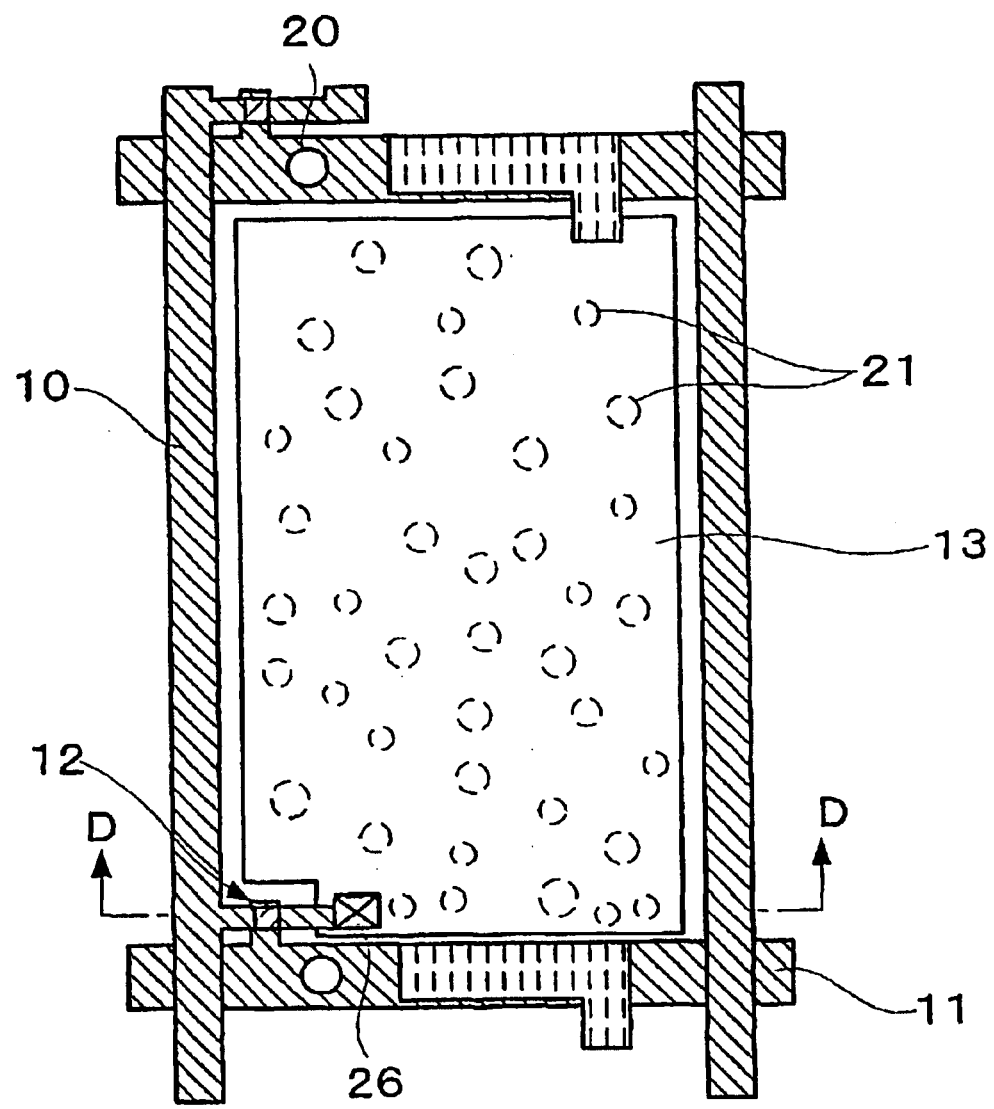
FIG. 12 is a plan view showing the main part of the liquid crystal panel mounted on the liquid crystal display device of a fifth embodiment.

FIG. 12 is a plan view showing the main part of the liquid crystal panel mounted on the liquid crystal display device of the fifth embodiment. FIG. 13 is a cross-sectional view of FIG. 12 taken along the line D—D. In FIGS. 12 and 13, those elements which are identical to the elements of the liquid crystal display of the first embodiment described above are identified with the same reference symbols, and repetitious explanation will be omitted.

The liquid crystal panel of the liquid crystal display device according to the present embodiment comprises, as same as that of the fourth embodiment, a first projection 20 having a greater projection height and a second projection 21 having a lower projection height both formed on the array substrate 1. Different from the fourth embodiment, in the present embodiment, the first projection 20 serves to control the orientation of the liquid crystal layer and the second projection 21 serves to diffuse the reflected light. The cell thickness between the array substrate 1 and opposing substrate 2 is kept constant by a spacer (not shown) made of glass fiber or the like having an even particle size. In other respect, the construction thereof is the same as that of the fourth embodiment.

Also in the present embodiment, formation of the first projection 20 and the second projection 21 can be achieved by performing gray-tone exposure (see, FIGS. 3(a) to 3(c)), and liquid crystal display devices can be manufactured by following the processes similar to those of the fourth embodiment.

As in the first embodiment, in the present embodiment, the first projection 20 and the second projection 21 can be formed on the opposing substrate 2 in a single process, simplifying the manufacturing process.

Furthermore, the first projections 20 and the second projections 21 can be formed precisely on the predetermined area. This makes it possible to dispose the first projection 20 outside the display region and a great many of the second projections 21 in each dot at a predetermined distribution. Thus, a reflection type liquid crystal display device displaying high quality pictures can be obtained.

The first projection 20 and the second projection 21 can be formed on the opposing substrate 2 using the same material, reducing the material costs.

(Sixth Embodiment)

Figure 14:
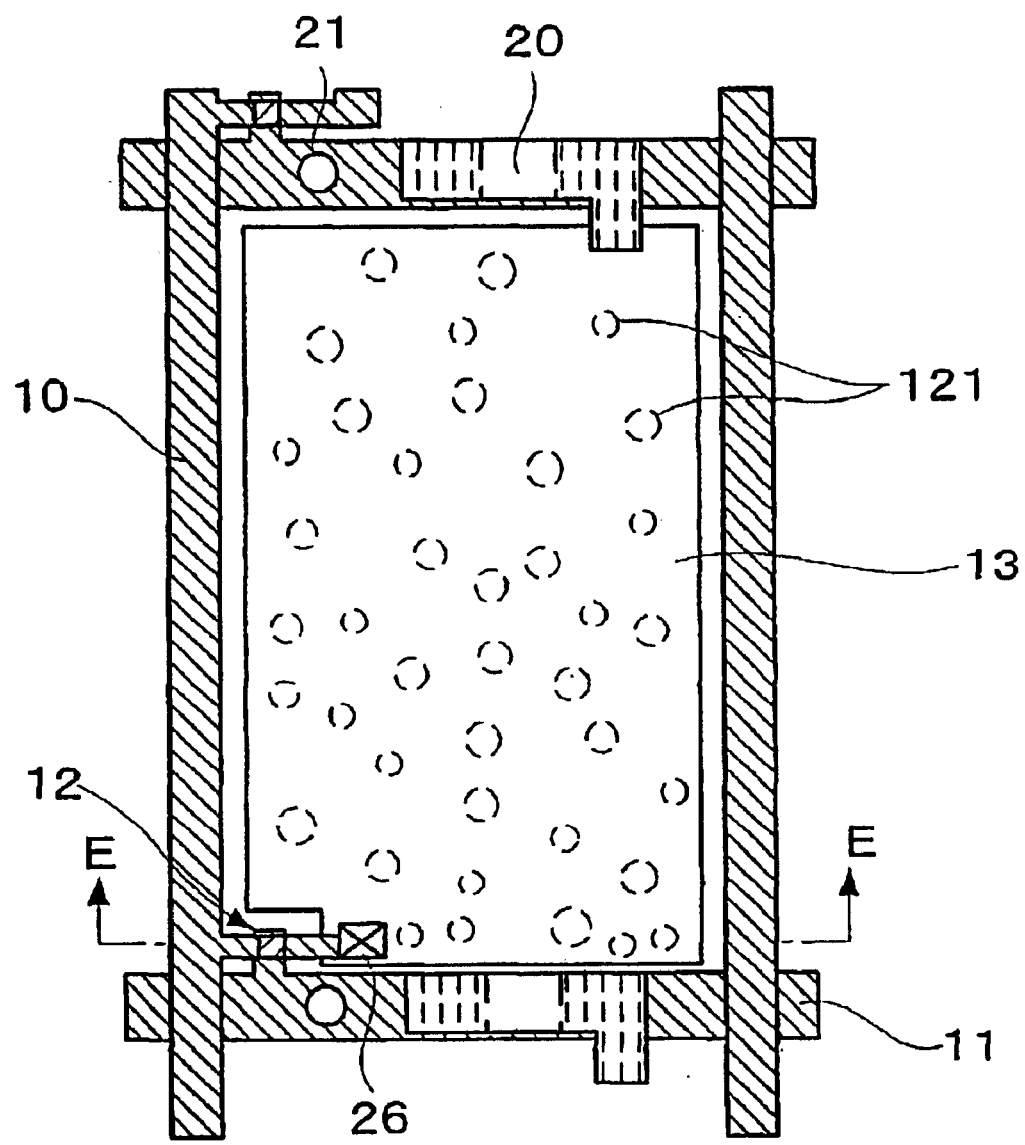
FIG. 14 a plan view showing the main part of the liquid crystal panel mounted on the liquid crystal display device of a sixth embodiment
Figure 15:
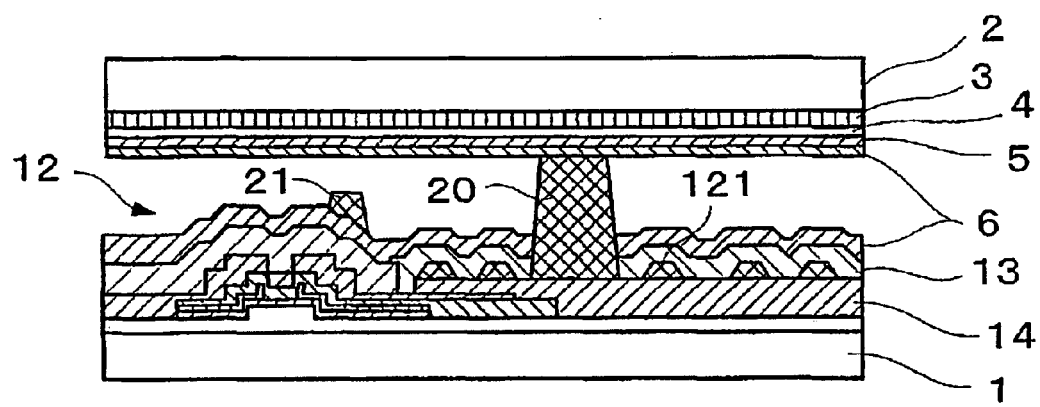
FIG. 15 is a cross-sectional view of FIG. 14 taken along the line E—E.

FIG. 14 a plan view showing the main part of the liquid crystal panel mounted on the liquid crystal display device of the sixth embodiment. FIG. 15 is a cross-sectional view of FIG. 14 taken along the line E—E.

In FIGS. 14 and 15, those elements which are identical to the elements of the liquid crystal display of the first embodiment described above are identified with the same reference symbols, and repetitious explanation will be omitted.

The liquid crystal panel of the liquid crystal display device according to the present embodiment comprises, in addition to the first projection 20 and the second projection 21, a third projection 121 formed on an array substrate 1. The first projection 20 having the greatest projection height functions to maintain a constant cell thickness, the second projection 21 having the second greatest projection height functions to control the orientation of the liquid crystal layer and the third projection 121 having the lowest projection height functions to diffuse the reflected light. In other respects, the construction thereof is the same as that of the fourth embodiment.

Figure 3:
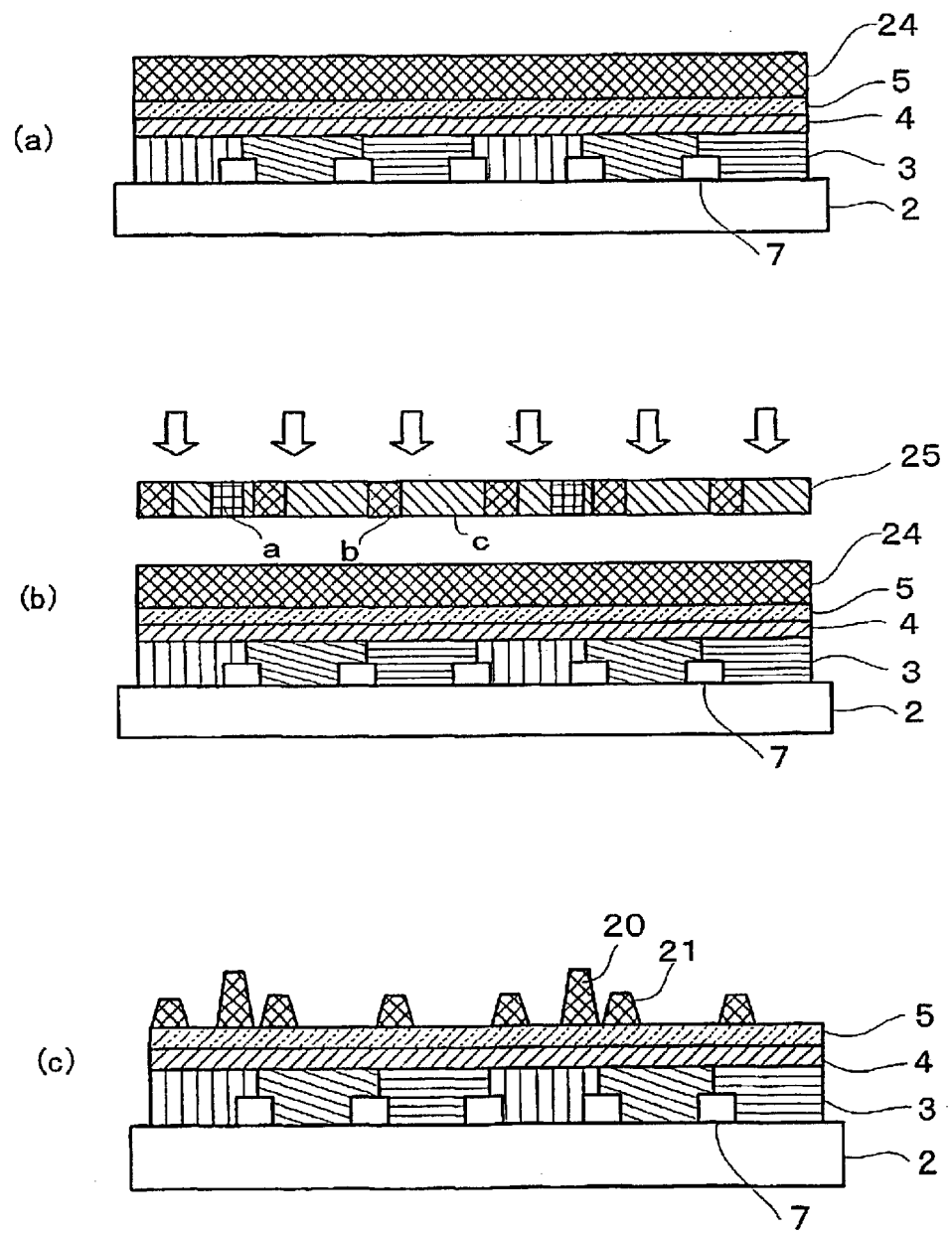
FIGS. 3(a) to 3(c) are cross-sectional views illustrating the production process of the opposing substrate composing the liquid crystal display device of the first embodiment.

Also in the present embodiment, formation of the first projection 20, the second projection 21 and the third projection 121 can be achieved by performing gray-tone exposure (see, FIGS. 3(*a*) to 3(*c*)). In the present embodiment, three kinds of projections are formed using a photomask 25 comprising the regions having the different transmittances each corresponding to the projection heights. Thereby, the first projection 20, the second projection 21 and the third projection 121 having different heights can be made of the same material in a single process. Thereafter, by following the same procedure as in the fourth embodiment, liquid crystal display devices can be manufactured.

In the present embodiment, in addition to the first projection 20 and the second projection 21, the third projection 121 can be formed on the opposing substrate 2 in a single process, simplifying the manufacturing process.

The first projection 20, the second projection 21 and the third projection 121 can be formed precisely on the predetermined area. Therefore, it is possible to dispose the first projection 20 and the second projection 21 outside the display region and a great many of the third projections 121 in each dot at a predetermined distribution. This makes it possible to obtain a reflection type liquid crystal display device displaying high quality pictures.

Furthermore, since the first projection 20, the second projection 21 and the third projection 121 can be made of the same material, material costs can be reduced.

(Seventh Embodiment)

In the first embodiment, a liquid crystal layer is formed between the array substrate 1 and the opposing substrate 2, by forming an empty panel out of the array substrate 1 and the opposing substrate 2, and injecting liquid crystal thereinto by the vacuum injection method. However, the liquid crystal layer can be formed using different methods. One of such examples is explained below with reference to FIGS. 16(*a*) and 16(*b*).

Figure 16:
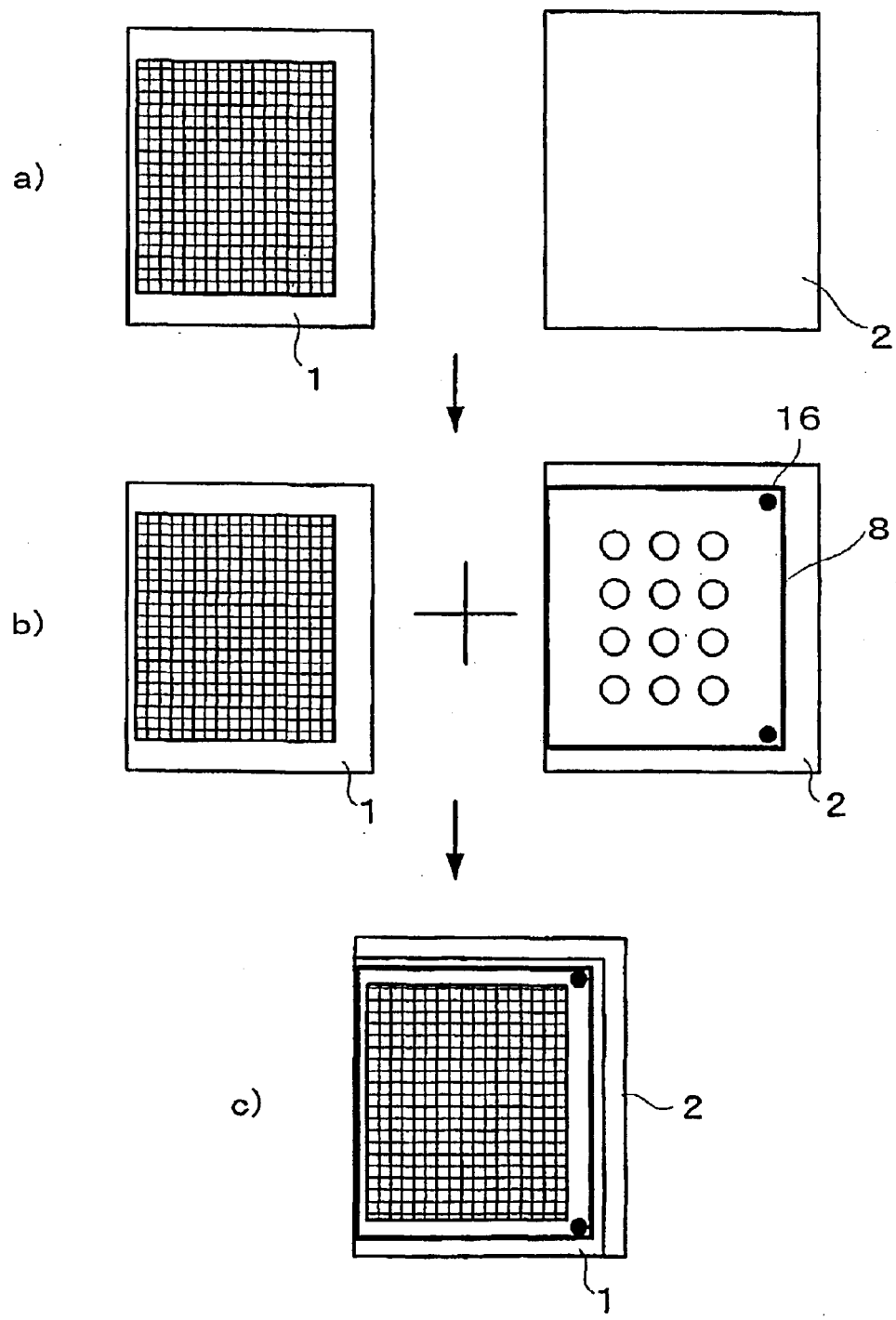
FIGS. 16(a) to 16(c) are cross-sectional views illustrating the production process of the liquid crystal display device of a seventh embodiment.

The array substrate 1 and the opposing substrate 2 are formed by following the same process as in the first embodiment (FIG. 16(*a*)). Then, sealing resin 8 made of photocurable resin is applied to either the array substrate 1 or the opposing substrate 2 along the sealing area. In order to make the array substrate 1 and the opposing substrate 2 conductive, conductive paste 16 is applied thereto, and then the prescribed amount of the liquid crystal is added thereto dropwise (see, FIG. 16(*b*)).

Thereafter, in a vacuum atmosphere having a low degree of vacuum, the array substrate 1 and the opposing substrate 2 are attached to each other and the sealing resin 8 is cured by irradiating it with ultraviolet rays, followed by heating to 100° C. for one hour. Then, the liquid crystal, which was added dropwise, is applied to all the corners of the panel (FIG. 16(*c*)).

Thereafter, on the outer surfaces of the array substrate 1 and the opposing substrate 2 (the other side of the facing surfaces), a polarizing plate is attached, thus obtaining a liquid crystal panel composing a liquid crystal display device.

According to the liquid crystal display device of the present embodiment, because a liquid crystal layer can be formed under a vacuum atmosphere having a low degree of vacuum, the array substrate 1 and the opposing substrate 2 can readily be formed in a short time even if they are large in size. Moreover, since most of the liquid crystal added dropwise can be used without making waste, reduction of the material costs can be achieved. Furthermore, since the process for injecting the liquid crystal is unnecessary, the manufacturing process can be simplified.

In the present embodiment, formation of the first projection 20 and the second projection 21 can be achieved, as in the third embodiment, by overlaying the projection color layers (see FIG. 9).

(Other Embodiments)

Embodiments according to the present invention are explained above; however, concrete embodiments of the invention are not limited to this explanation. For example, the first projection 20, the second projection 21 and the third projection 121 (hereinafter simply referred to as "projections") can be arranged either on the array substrate 1 or the opposing substrate 2 in the above embodiments.

The projection formation methods are not limited to the above embodiments and, for example, ink jet printing or other printing method can be employed.

In the above embodiments, photosensitive resin is used as a material for projections; however, projections can be formed by etching using non-photosensitive resin or a metal material. For example, because aluminum or the like is used as a wiring metal on the array substrate 1, forming projections using the same kind of metal can reduce material costs. On the end of the projection made of a metal material, an insulating film can be formed, if necessary.

As a substrate material for the array substrate 1 and the opposing substrate 2, in addition to glass, a plastic film or the like can be used.

In the above embodiments, the invention is applied to an OCB-mode or VA-mode liquid crystal panel; however, the invention can also be applied to various types of liquid crystal panels of TN (Twisted-Nematic) mode, STN (Super-Twisted-Nematic) mode, IPS (In-Plane-Switching) mode, polymer distributed liquid crystal mode, high-dielectric liquid crystal mode, anti-high-dielectric liquid crystal mode or the like.

In the invention, as an active element, a TFT, which is a three-terminal element, is used; however, a two-terminal element such as an MIM (Metal-Insulator-Metal), a ZnO varistor, an SiNx diode and an a-Si diode can also be used. A passive-type panel such as TN or STN in which active elements are not formed can also be used.

Furthermore, in the above embodiments, the display color layer 3 is protected by the overcoat layer 4; however, it is not necessary to form the overcoat layer 4.

As a method to form the display color layer 3, as well as the pigment dispersion, dyeing, printing or ink jet printing can be employed. It is also possible to obtain a liquid crystal panel without forming a display color layer 3.

In the above embodiments, projections are disposed also on the sealing area between the array substrate 1 and opposing substrate 2 for obtaining an even thickness. However, spherical resin spacers or pole-shaped spacers made of SiO2 or resin can be provided on the seal area instead.

Moreover, the insulating films or orientation films can be colored.

What is claimed is:

1. A liquid crystal display device comprising:

a pair of substrates each having an electrode; and a liquid crystal layer held between the pair of substrates, wherein at least two projections having different heights are formed on one of the pair of substrates using the same material, wherein the projections comprise a first projection and a second projection shorter than the first projection, wherein the second projection is covered with the electrode formed thereabove, and wherein the first projection keeps a constant space between the pair of substrates, and the second projection forms asperities on the electrode to diffuse the reflected light.

2. The liquid crystal display device according to claim 1, wherein the first projection has a distribution density of $25/mm^2$ or less.

3. The liquid crystal display device according to claim 1, wherein the second projection has a distribution density of $400/mm^2$ or greater.

* * * * *

UNITED STATES PATENT AND TRADEMARK OFFICE
CERTIFICATE OF CORRECTION

PATENT NO. : 6,850,309 B2
DATED : February 1, 2005
INVENTOR(S) : Inoue Kazuo et al.

It is certified that error appears in the above-identified patent and that said Letters Patent is hereby corrected as shown below:

<u>Title page,</u>
Insert Item:
-- [30] Foreign Application Priority Data
   2001-1060   JP   09/01/2001
 2001-64578   JP   08/03/2001
 2001-184481   JP   19/06/2001 --
Item [56], References Cited, FOREIGN PATENT DOCUMENTS, delete
"JP 2000-29051  1/2000
JP 2000-187210  7/2000
JP 2000-338520  12/2000"

Signed and Sealed this

Twelfth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,850,309 B2
DATED : February 1, 2005
INVENTOR(S) : Inoue Kazuo et al.

It is certified that error appears in the above-identified patent and that said Letters Patent is hereby corrected as shown below:

Title page,
Item [75], Inventors, change the cities of residence for the three inventors as follows: "Kazuo Inoue, Hirakata (JP)" to -- Kazuo Inoue, Osaka (JP) --; "Katsuhiko Kumagawa, Neyagawa (JP)" to -- Katsuhiko Kumagawa, Osaka (JP)" -- ; "Akio Takimoto, Neyagawa (JP)" to -- Akio Takimoto, Osaka (JP) --.

Signed and Sealed this

Thirteenth Day of September, 2005

JON W. DUDAS
*Director of the United States Patent and Trademark Office*

UNITED STATES PATENT AND TRADEMARK OFFICE
CERTIFICATE OF CORRECTION

PATENT NO.    : 6,850,309 B2
DATED         : February 1, 2005
INVENTOR(S)   : Inoue Kazuo et al.

It is certified that error appears in the above-identified patent and that said Letters Patent is hereby corrected as shown below:

Title page,
Item [75], Inventors, change the cities of residence as follows:
"Kazuo Inoue, Hirakata (JP)" to -- Kazuo Inoue, Osaka (JP) --;
"Katsuhiko Kumagawa, Neyagawa (JP)" to -- Katsuhiko Kumagawa, Osaka (JP) --;
"Akio Takimoto, Neyagawa (JP)" to -- Akio Takimoto, Osaka (JP) --.

Signed and Sealed this

Fourth Day of October, 2005

JON W. DUDAS
*Director of the United States Patent and Trademark Office*